United States Patent [19]

Kowalski

[11] Patent Number: 4,483,886

[45] Date of Patent: Nov. 20, 1984

[54] METHOD FOR MAKING FREE-FLOWING, MELT-COATED RUBBER PELLETS

[75] Inventor: Ronald C. Kowalski, New Providence, N.J.

[73] Assignee: Exxon Research & Engineering Co., Florham Park, N.J.

[21] Appl. No.: 382,378

[22] Filed: May 27, 1982

[51] Int. Cl.³ .............................................. B05D 7/00
[52] U.S. Cl. .................................... 427/213; 427/221; 427/222; 427/316; 427/398.1
[58] Field of Search ............ 427/222, 213, 221, 398.1, 427/316

[56] References Cited

U.S. PATENT DOCUMENTS

| 2,059,983 | 11/1936 | Dent et al. | 427/222 |
| 3,462,293 | 8/1969 | Voris | 427/213 |
| 3,669,722 | 6/1972 | Bishop | 51/278 |

FOREIGN PATENT DOCUMENTS 986612  3/1965  United Kingdom ............... 427/213

Primary Examiner—Michael R. Lusignan
Assistant Examiner—Janyce A. Bell
Attorney, Agent, or Firm—S. H. Markowitz

[57] ABSTRACT

A continuous method for making free-flowing, melt-coated elastomeric pellets is disclosed in which pellets are coated with particles of coating material in a zone of interference created in a pneumatic conveying system.

24 Claims, 3 Drawing Figures

METHOD FOR MAKING FREE-FLOWING, MELT-COATED RUBBER PELLETS

BACKGROUND OF THE INVENTION

The present invention relates to the manufacture of polymeric elastomeric materials (elastomers), e.g., those in an uncured state used in the manufacture of rubber products such as tubing, belts, tires, sheeting, etc., by subsequent cure or vulcanization of formulations embodying the elastomeric materials. More specifically, it relates to a method for making melt-coated, free-flowing elastomeric pellets to improve the handling of the same in packaging, shipment and use.

Most elatomers are normally shipped and used as bales, especially those which are tacky or subject to cold flow. This practice has several disadvantages particularly as it relates to rubber. The material cannot be transported in bulk, the bales must be cut or milled on expensive, large scale equipment and the bales cannot be preblended with other materials. The result is that these materials are expensive to handle and ship. More important, elastomers have not reached their full sales potential in many market areas. They have either been restricted to batch rather than continuous processes in normal applications, or a separate step of grinding is required prior to the continuous process. Plastics blending applications have been particularly plagued with these problems, since the plastic component of the blend is in pellet form. It has been considered desirable for some time to obtain elastomers in pellet form. The difficulty encountered for most elastomers has been that the pellet surfaces adhere to each other or in a very short time flow together into a solid mass.

Numerous attempts have been made to overcome these disadvantages. Dusting with inorganic materials, e.g., clay, talc and the like, allows maintenance of discreet pellets for short periods of time. Slightly better results have been attained by dusting with selected organic materials such as hydrocarbon waxes (British Pat. No. 901,644) or powdered solid polyethylenes and polypropylenes (British Pat. No. 928,120). However, all of these methods are useful only for relatively short periods of time. On long-term storage, because of the discontinuity of the pellet coating, the pellets will still flow together into a solid mass.

Another approach to the problem, yielding somewhat better results, has been to blend into rubber a crystalline type of polymer such as polyethylene or polypropylene or copolymers thereof, during the rubber finishing operation. This renders the product non-tacky and non-flowable and, therefore, suitable for pelletization. Disadvantages of this type of operation are that the resulting pellets, while relatively free flowing, contain a maximum of only about 50% rubber with the crystalline polymer intimately admixed therewith. Such a high percentage of irremovable crystalline polymer makes this type of pellet disadvantageous for many purposes.

A further approach to the problem relates to emulsion coating techniques in which rubber is either dipped in an emulsion of coating material in a solvent or the emulsion is sprayed on pellets of the rubber. In either case, the emulsion-coated rubber must be dried as, for instance, in a fluidized bed through which hot air is circulated to evaporate the solvent. However, emulsion coating techniques are undesirable because they require the use of solvents. The cost of the solvents add to the overall cost of the coating process. Also, if the solvent is to be recovered, extra equipment for a solvent recovery system must be purchased, operated and maintained. If hot air is to be used to evaporate the solvent from the emulsion-coated rubber, the expense of heating the air is also incurred. Also, significant deficits can be incurred due to lost process time, because the coating and/or drying steps are typically batch operations.

Melt-coating methods for producing free-flowing rubber pellets have also been suggested. According to U.S. Pat. No. 3,669,722 to Bishop, heated melt-coating material and rubber to be coated are fed as continuous films from separate extruders to a common coating die. A continuous melt-coated rod of rubber issues from the coating die, is cooled in a cooling liquid bath, and is then cut into pellets by a pelletizer. Not only is this melt-coating system seen to add excessively to the overall cost of rubber manufacture, but it is also seen to have limitations with respect to efficiently producing large quantities of coated rubber pellets. According to British Pat. No. 1,322,623 to Kresge et al, pellets of the rubber to be coated are first heated to a temperature higher than the melting point of the coating material. The pellets are then contacted with the coating material which is preferably in the form of fine powder. The heated pellet fluxes the coating material on the surface of the pellet to form a substantially continuous film. The hot, coated pellet is then cooled.

While such melt-coating is highly preferred for producing free-flowing pellets of rubber, a commercially attractive method for producing such pellets has not yet been developed. Significant problems faced in developing a suitable method relate to lost production time or economic incentive in heating the coating material to a temperature above its melting point, achieving substantially complete coverage of the rubber pellet with solid coating material before it is melted, preventing the pellets from adhering to each other while the coating is molten, and cooling the melted coating to a temperature below its melting point to set the coating on the pellet.

With respect to supplying enough heat to the coating material to get its temperature above its melting point, the above-noted patent to Bishop provides a separate extruder for supplying melted coating material to a coating die. However, Kresge et al does indicate that if the coating material is to be applied as a fine powder to pelletized rubber, a normal extrusion process for making the pellet may generate sufficient heat to melt the coating material.

With respect to techniques for applying the coating material to the rubber, Bishop applies the same in preheated melt form to a continuous rod of rubber which is subsequently cooled and cut into pellets. Kresge et al is silent on this point.

With respect to cooling the melted coating once it has been applied to the rubber, Bishop suggests the use of a bath of cooling liquid. Kresge et al suggests the use of a water bath or air cooling.

The present inventor has discovered a method for producing melt-coated, free-flowing pellets of elastomeric material which method is seen to be commercially attractive. Broadly, the present inventor has discovered that pellets of elastomer such as those produced in the course of extrusion or extrusion drying can be continuously coated by the use of novel concepts built into a pneumatic conveying system. Basic steps of a method in accordance with the present invention comprise:

1. mixing coating material with at least one stream of carrier gas to form at least one coating stream, the carrier gas having a temperature below the melting point of the coating material;
2. contacting at least one pellet to be coated having a temperature above the melting point of the coating material with the coating stream so as to form at least one layer of substantially melted coating material on the rubber pellet; and
3. cooling the resulting melt-coating to a temperature below its melting point temperature.

The pellets are introduced into the coating stream so as to create at least one "zone of interference" in which a relative velocity difference exists between solid particles of coating material and the pellets for some distance along the pneumatic conveying system, that is, the solid particles of coating materials are traveling faster than are the pellets. This hesitation of the pellets before they attain the speed of the coating stream permits the solid coating material to bombard the pellets, substantially covering the pellet surfaces with particles of coating material. The heat contained in the pellets will then cause at least partial fusion of the solid particles permitting the formation of a substantially melted coating on the pellets. In turn, the temperature and heat content of the carrier gas is low enough to then solidify the thus-melted coating. By causing the pellets to flow co-currently with the coating stream from the zone of interference to a downstream zone, agglomeration of the pellets is avoided as the co-current carrier gas tends to spread the pellets out.

It was discovered that in a pneumatic conveying system such a method could be practiced in which the total energy and heat transfer characteristics of the pellet, the carrier gas and the coating material was sufficient to melt-coat the pellet and then cool the resulting melt-coating to a temperature below its melting point. In practicing methods in accordance with the present invention, the relative heat transfer rates between the pellet and the coating material and the pellet and the carrier gas should be controlled to ensure that step 2 is accomplished before step 3, which opposes step 2, quenches the system. Thus, the temperature of the carrier gas should not be so low as to cause the cooling of the pellet before a substantially continuous coating is fused to the pellet surface. Similarly, the temperature of the pellet should be high enough to fuse a substantially continuous layer of coating material around the pellet before the carrier gas solidifies the fused coating. Having the benefit of the present disclosure, the artisan could easily accomplish these objectives using well-known thermodynamic calculations as illustrated below in EXAMPLE 1.

In practicing methods in accordance with the present invention, melt-coated, free-flowing pellets of elastomeric material can be made in a continuous manner with essentially zero process inventory, and using only a minimal amount of excess energy above that required to melt the coating material. It is preferred that the energy is not specifically generated to accomplish the coating, but is the same energy used to make the extruded pellet.

It is common in the published literature in the area of manufacturing rubber pellets to see batch-type coating operations in which the pellets are recirculated or held in place until they are adequately coated. This creates an undesirable "inventory" of rubber pellets while they are being coated. See, for example, U.S. Pat. No. 3,669,722 to Bishop wherein rubber crumb is fed batchwise to a fluidized bed in which the rubber pellets are continuously recirculated until coated.

For general background relative to coating techniques for coating particles, both elastomeric and non-elastomeric, reference is made to the following:

U.S. Pat. No. 2,895,939 discloses making non-agglomerative rubber pellets by dusting the same with an impalpable resinus vinyl aromatic polymer dust.

U.S. Pat. No. 2,059,983 discloses a system for melt-coating preheated particles of inorganic abrasive material with thermo-setting resin to render abrasive particles which do not cohere to one another, but which on subsequent heating can be pressed together and made to cohere. The particles are preheated in a jar to a temperature above the melting point temperature of the coating material, but below the melting point of the particles to be coated, and then caused to cascade downwardly over a mixing baffle and then counter-currently to an upwardly traveling stream of cooling air in which is entrained the coating material.

U.S. Pat. No. 3,241,246 discloses a method and apparatus for simultaneously drying and dust-coating rubber crumb in a fluidized bed. A non-melting coating material, such as talc or carbon black, is mixed with the drying medium, superheated steam, and then dusts the rubber pellets in the fluidized bed. The rubber pellets are made inside the fluidized bed apparatus using an extruder die/cutter arrangement. The rubber pellets are retained in the fluidized bed and then overflow into a box outlet for further processing.

U.S. Pat. No. 3,241,520 discloses particle coating apparatus in which the particles are recirculated and spray-coated with an emulsion coating until sufficiently coated. A heated gas stream causes the particles to recirculate and dries the coating. FIG. 13 illustrates a semi-continuous operation in which seven spray-coating systems are arranged in series.

U.S. Pat. No. 3,253,944 shows a similar particle coating system in which particles are recirculated through a spray of emulsion coating until sufficiently coated.

U.S. Pat. No. 3,503,778 discloses a method of melt-coating a continuous web of substrate using a plastic powder.

U.S. Pat. No. 3,528,841 discloses a method for reducing the tackiness of polymer pellets by coating the same with microfine (average size less than 10 microns) polyolefin powder by dispersion techniques, tumbling, electrostatic transfer or airveying.

U.S. Pat. No. 3,687,699 discloses the use of talc as a dusting agent to render tacky pellets less tacky. The dusting is done simultaneously with both the cutting of the pellets and the cooling thereof by the combined use of a water spray and flowing air.

Great Britain No. 928,120 discloses coating polymer pellets with polyethylene powder using tumbling or dripping techniques. The pellets can be cold or hot (120°–150° F.) when coated.

Great Britain No. 1,105,680 discloses a continuous process for wax-coating granular thermoplastic using a melt-coating technique.

BRIEF DESCRIPTION OF THE INVENTION

Broadly, methods practiced in accordance with the present invention comprise the steps of:

1. mixing coating material with at least one stream of carrier gas to form at least one coating stream, the carrier gas having a temperature below the melting point of the coating material;

2. contacting pellets of elastomeric material, each having a temperature above the melting point temperature of the coating material, with the coating stream so as to form at least one layer of substantially melted coating on the pellets; and 3. cooling the resulting melt-coating to a temperature below the melting point temperature of the coating material.

The pellets are introduced into the coating stream so as to create at least one "zone of interference" in which a relative velocity difference exists between solid particles of coating material and the pellets for some distance along the pneumatic conveying system, that is, the solid particles of coating material are traveling faster than are the pellets. This hesitation of the pellets before they attain the speed of the coating stream permits the solid coating material to bombard the pellets, substantially covering the pellet surfaces with particles of coating material. The heat contained in the pellets will then cause at least partial fusion of the solid particles permitting the formation of a substantially melted coating on the pellets. In turn, the temperature and heat content of the carrier gas is low enough to then solidify the thus-melted coating.

The following steps are recommended to achieve a suitable zone of interference:

1. the carrier gas stream velocity should be sufficiently high to create a long zone of interference;

2. the coating material should be introduced into the carrier gas at a point sufficiently upstream of the zone of interference to ensure that the coating has achieved substantially the full velocity of the carrier gas stream;

3. the pellets should be introduced into the coating stream at substantially zero velocity or some negative velocity in the direction of flow of the coating stream, thus requiring the pellets to attain their ultimate (co-current) velocity primarily by impact with, and drag from, the stream;

4. the pellet masses should be large enough so that achievement of their ultimate velocity requires a sufficiently long period of time to permit contact of all parts of the pellet surfaces by the coating material; and 5. the coating particle masses should be small enough so that acceleration of the rubber pellets does not occur too rapidly to defeat the purposes of step 4 above.

A device which imparts a tumbling action to the pellets, such as a known turbulator cutter, may be employed to further enhance the effectiveness of the zone of interference.

These coating effects can be accomplished if the relative sizes of the pellets and the solid coating particles are properly selected. For example, a ratio of average pellet diameter to average coating particle diameter of at least about 100:1 should ensure the desired results.

In practicing methods in accordance with the present invention, the pellets are preferably made, using an extruder die plate/cutter arrangement, right in the carrier gas stream. Assuming the pellets are heated in an extruder and are tacky, cutting the pellets right in the carrier gas stream overcomes the problem of how to handle the tacky pellets in introducing them into the gas stream. This will also maximize the relative velocity between the pellets and the solid particles of coating material since the freshly cut pellets will each have substantially zero velocity in the direction of flow of the coating particles.

Of course this velocity could also have some negative value due to the weight of the pellets causing them to flow counter-currently to the coating stream for a short distance before co-current flow commences or due to the introduction of the pellets into the coating stream at an angle which gives the same effect.

It is observed in some known extruder die/cutter techniques for making pellets of elastomer (see, for example U.S. Pat. No. 3,241,246) that upon formation at the cutter, the pellets may "explode" due to vaporization of the moisture contained in the elastomer. This explosion yields pellets of increased surface area which have shapes approximately the shape of popcorn. As the surface areas of the pellets increase, the operational requirements of the coating process increases, e.g., demand on thermodynamics of the system and coating material loading in the carrier gas will increase. That is, the higher the surface area of the pellet, the more coating material required to coat this surface area and the more heat required in the pellets to melt the coating material. However, since this explosion effect and, thus, the surface area of the resulting pellets can be reduced by simply reducing the moisture content of the material before pelletization, the thermodynamic and material requirements of the process can be optimized by controlling the moisture content of the material. This can be accomplished by any known means such as extrusion of the material in several extruders arranged in series before pelletization.

BRIEF DESCRIPTION OF THE DRAWINGS

The above-noted and other objects, features and advantages of methods practiced in accordance with the present invention will readily occur from the following description and the accompanying drawings which depict, for illustration purposes only, methods embodied by the present invention and wherein.

DETAILED DESCRIPTION OF INVENTION

Figure 1:
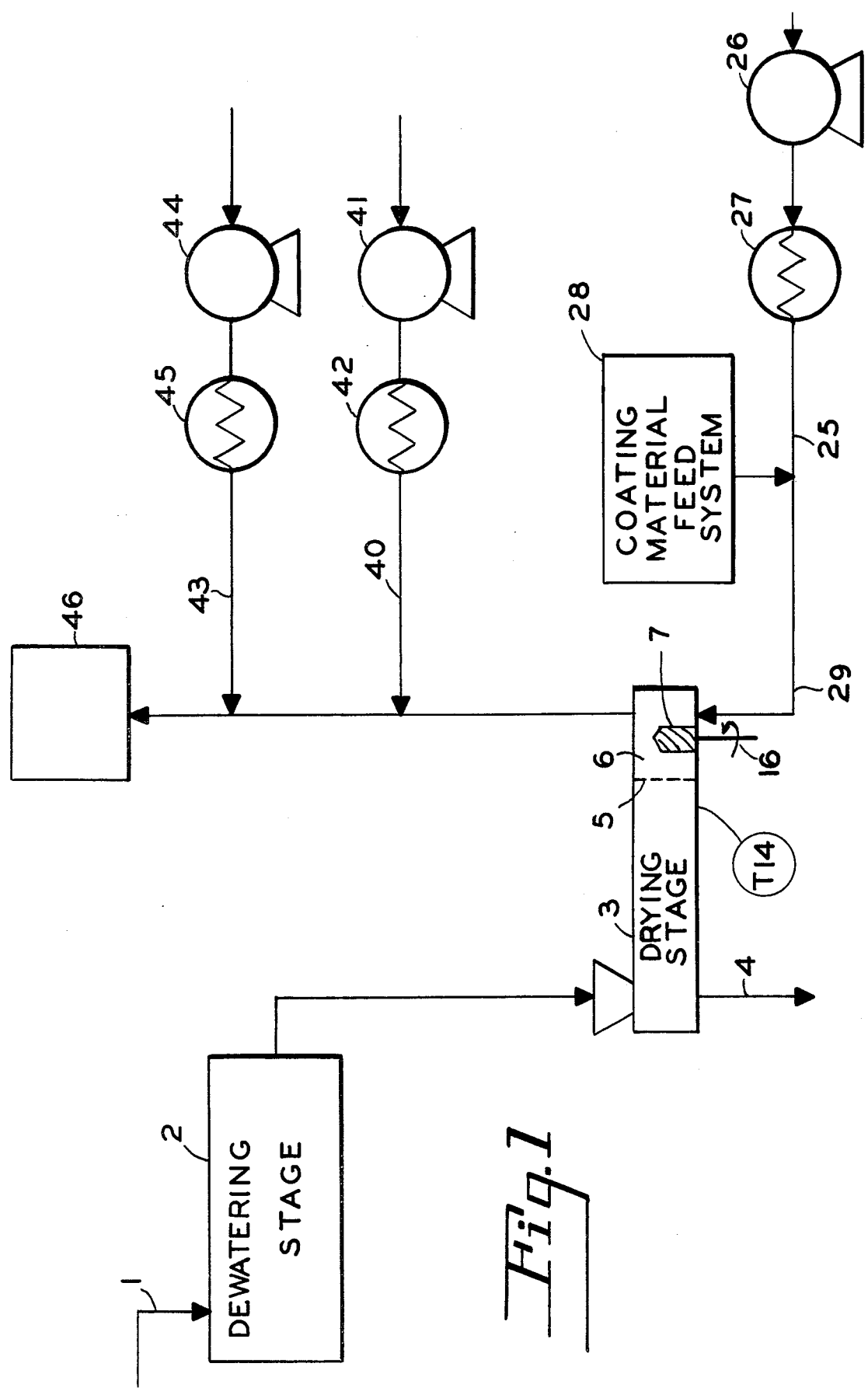
FIG. 1 is a schematic representation of apparatus useable in practicing methods in accordance with the present invention.

The present invention is particularly well-suited for methods for making melt-coated, free-flowing rubber ellets in a continuous manner. However, it is believed that methods in accordance with the present invention would be useful for melt-coating pellets of any material that is tacky and tends to agglomerate under conditions of long term storage. Coatable materials would include all macromolecular materials having a glass transition temperature (Tg) and melting point temperature (Tm) [defined by F. W. Billmeyer, "Textbook of Polymer Science" (Interscience, 1962), pp. 198-204 and pp. 157-159] in the elastomeric range, i.e., both Tg and Tm below 20° C. Included would be blends and plasticized versions of elastomer.

Illustrative examples of coatable material are:
ethylene-propylene copolymers, e.g., EP and EPDM rubbers
isobutylene-isoprene copolymers (butyl rubber)

natural rubber
polyisoprene
polyisobutylene
polybutadiene
halogenated butyl rubber
polychloroprene
polysulfides
polyepoxides, e.g., polypropylene oxides and copolymers
polyepichlorohydrin
chlorinated polyethylene
silicone rubbers
styrene-butadiene copolymers
butadiene-acrylonitrile copolymers
urethane elastomers
halogenated ethylene-propylene copolymers
polyethacrylate
blends and plasticized versions of the above.

The preferred polymers to be coated are EP, EPDM, polyisoprene, polybutadiene, polyisobutylene, butyl rubber and styrene-butadiene copolymer. Methods in accordance with the present invention are considered to be particularly well-suited for coating tacky EPDM rubber pellets.

Illustrative examples of useful coating materials are:
polyethylene
polypropylene
polystyrene
polyvinyl chloride
polyacrylates
polymethacrylates
polyimides
polyvinyl alcohol
polyvinylidine chloride
ethylene-vinyl acetate copolymers
ethylene-alpha-olefin copolymers of high crystallinity (e.g., 90 mole % ethylene and 120,000 number average molecular weight)
petroleum and terpene resins
poly-alpha-methylstyrene
poly-4-methylpentene
polyacrylonitrile
cellulose esters
acetal polymers and copolymers
polyesters
coumarone-indene resins
polyvinyl acetate
styrene acrylonitrile copolymers
mixtures of the above The coating materials should have the properties of low shear rate viscosity, low enough that it will flow together upon heating, and resistance to failure (e.g., cracking) during storage. The preferred coating materials have a melting point temperature greater than about 150° F. and less than 450° F., e.g., polyethylene, polypropylene, polystyrene and polyvinyl chloride. Polyethylene is considered to be particularly well suited for coating tacky rubber pellets of EPDM.

Methods practiced in accordance with the present invention comprise the steps of:

1. mixing coating material with at least one stream of carrier gas to form at least one coating stream, the carrier gas having a temperature below the melting point of the coating material;
2. contacting at least one pellet to be coated having a temperature above the melting point temperature of the coating material with the coating stream so as to form at least one layer of substantially melted coating material on the pellet; and 3. cooling the resulting melt-coating to a temperature below its melting point.

Particularly well-suited apparatus for introducing the pellets into the carrier gas is disclosed in U.S. Pat. No. 3,973,890 to Porter et al, which is incorporated herein by reference. This apparatus is illustrated herein in FIG. 3. Using this apparatus, the pellets are made right in the stream of carrier gas, avoiding the obvious problems related to handling tacky elastomeric pellets. Also, this apparatus provides for introduction of the pellets in a direction generally transverse to the direction of flow of carrier gas, which has the beneficial effect of enhancing the relative velocity between the particles of coating material and the pellets. The greater this relative velocity, the greater the number of collisions between coating particles and pellet and the greater the extent of coating on the pellet. As would occur to the artisan having benefit of the present disclosure, many other devices for extruding and cutting pellets can be adapted to this invention, so long as the requirements of total energy, pellet temperature, relative heat transfer rates and zone of interference are incorporated in the device.

The elastomeric material being pelletized will have a temperature at or above (at least at) its melting point. Melting point is intended to mean that if the material contains crystallinity, then the temperature is above its crystalline melting point, whereas, in the case of non-crystalline material, the temperature is above its glass transition temperature. However, as is well known, each elastomer has a temperature at which its dsirable properties are lost, i.e., a temperature of degradation. Accordingly, the temperature of the material to be coated should be above its melting point but below its temperature of degradation.

The pellet should contain enough heat to substantially melt the coating material present on its surface from bombardment with coating material in the zone of interference. Preferably, it should contain enough heat to melt all of the coating material. To this end, the pellet should be introduced at a temperature sufficiently above the melting point of the coating material to provide enough energy to bring the coating material to its melting point (sensible heat) plus enough to satisfy its latent heat of fusion requirement. In addition, a still further temperature increment is required to act as a driving force to ensure that the transfer of required sensible and latent heat occurs before the pellet is cooled by the gas stream to a temperature below the melting point of the coating material. For example, pellet temperatures that are 25°–250° F. higher than the melting point temperature of the coating material should be suitable. It is preferred that the required heat be generated by the normal extrusion process for making the pellet; however, an external source of heat may also be used. Also, to this end, the relative size of the rubber pellet and the particles of coating material is important in that below a certain relative ratio, the pellet will not contain enough energy to melt the coating material as desired. It being kept in mind that the rubber pellets and coating particles will have irregular cross-sectional shapes and that techniques for determining average diameters are known [Clyde Orr et al *Fine Particle Measurement*, New York: The MacMillan Company, 1960], it is believed that a ratio of the average diameter of the elastomeric pellet to the average diameter of the coating particles of at least about 10:1 should be suitable. A ratio of at least 25:1 is preferred with a ratio of at least 100:1 being most preferred. Suitable results have been observed when the ratio was about 500:1.

The requirement of relative size ratios to satisfy the energy requirements is different than the relative size ratio requirement, discussed earlier, to achieve a sufficiently long range of interference for purposes of a complete coating. Fortunately, however, it has been found that the numerical values for the ratios for the two purposes are not inconsistent. For practical purposes, a broad enough overlapping range of ratios exists in which the two effects can be achieved simultaneously.

The pellet can be of any shape and be as small as about 1/32 inch in its largest dimension. The preferred minimum is about ⅛ inch. The upper limit for pellet size will depend only on its ability to be conveyed and cooled by the carrier gas stream. About 1 inch would be a suitable upper limit. About ½ inch is the preferred upper limit, however.

Coating material particles in the 10 to 20 micron size range have been used successfully in melt-coating elastomeric pellets. With regard to an upper size limit, it should be kept in mind that the thermodynamic and mass requirements of the system must be satisfied as discussed above. The particles could be as high as about 200 microns in size, with 50 microns being preferred as the upper limit. The smaller particles are preferred.

The carrier gas could be any inert gas such as nitrogen or argon. However, air is preferred.

The coating material is preferably used as a fine powder which has been mixed with the carrier gas at some point upstream of the zone of interference. The powder content of the carrier gas will depend on the amount of coating desired on the pellet. On a weight basis, it is believed that the minimum amount of coating should be about 1% of the pellet. The preferred minimum is about 5%. About 15% is the desired maximum. Above that amount, the final product may be considered to be contaminated with too much coating material as an impurity. The preferred maximum is about 10%.

In practicing methods in accordance with the present invention, free flowing, easily mixable pellets are produced in a continuous manner which maintain their integrity on long-term storage. The pellets each have at least one layer of substantially continuous melt-coating film formed thereon. By "substantially continuous" is meant that at least 80% of the total surface area of the pellet is covered by film. Preferably, at least 90% of the total surface area is so covered. Microscopic examination has been used to determine the percent continuity and it has been found even for 80% coverage that, effectively, a continuous film is present. Because of increasing tendency to ooze through any "breaks" in the film, the softer the pellet, the greater should be the coverage.

The average thickness of the film coating may vary over a wide range. The minimum average thickness would be about 0.00025 inch, with about 0.0005 inch being the preferred minimum. The maximum average thickness would be about 0.05 inch, with about 0.02 being the preferred maximum.

Since processes in accordance with the present invention are considered to be particularly suitable for coating pellets of rubber, the following description is presented in the context of coating rubber.

The production of rubber typically involves polymerization in which an aqueous slurry of rubber crumb is produced, followed by dewatering of the slurry and then extrusion drying of the rubber. Accordingly, methods in accordance with the present invention are seen to be most effectively, but not necessarily, practiced in combination with both the dewatering and drying extrusion stages of the process. With reference to the accompanying drawings, particularly FIG. 1, reference numeral 1 indicates a stream of a rubber crumb slurry passing from a production process, not shown, to a dewatering extruder stage used in practicing methods in accordance with the present invention. While the dewatering stage is preferred in practicing methods in accordance with the present invention, it is not necessary. Reference numeral 2 generally refers to the dewatering stage which can be of any well-known standard dewatering extruder construction. The dewatering stage can be either a single dewatering unit or a plurality of the same arranged in series.

Reference numeral 3 generally refers to the second, drying extrusion stage of a preferred system used in practicing methods in accordance with the present invention. The second stage heats the rubber and, preferably, comprises a standard, known extruder apparatus as, for example, that generally described in U.S. Pat. Nos. 3,973,890 or 3,241,246. Reference numeral 4 refers to a water drainage line. At the downstream end of extruder 3 is die plate 5 which communicates with a first zone 6 of a pneumatic conveyor system, preferably an air system. In this second stage, rubber is heated, extruded through openings in die plate 5 and then cut into pellets by rotating cutter means 7 in first zone 6. As already noted, a particularly well-suited expeller die/cutter arrangement for use in practicing methods in accordance with the present invention is disclosed in U.S. Pat. No. 3,973,890. For purposes of explanation, FIG. 1 from that patent has been transposed to FIG. 3 in the accompanying drawing.

Figure 3:
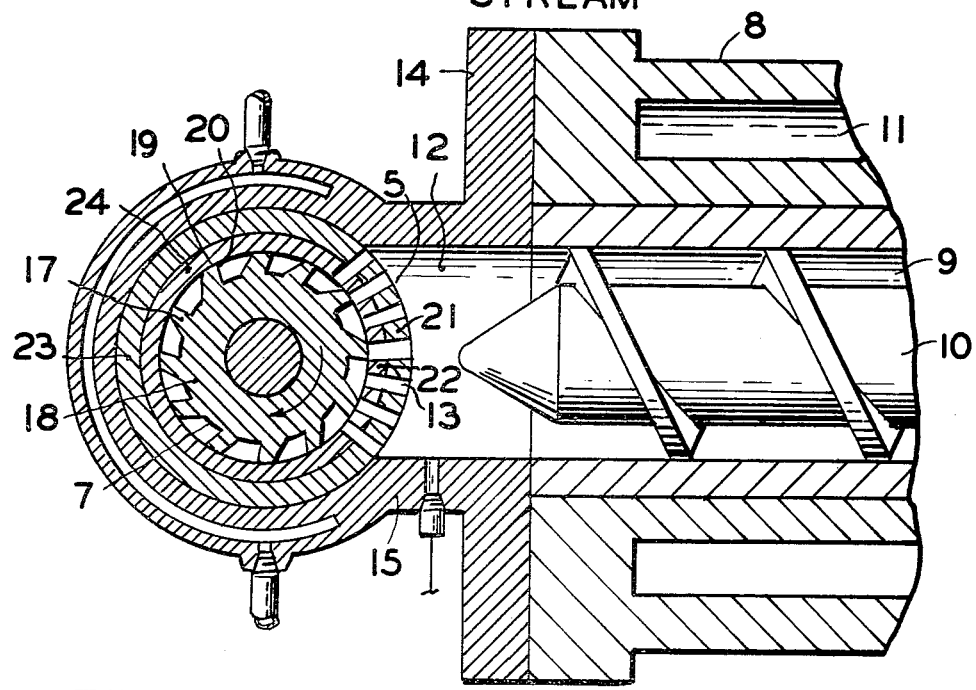
FIG. 3 is an enlarged view in section of pellet feeding apparatus particularly well-suited for use in practicing methods in accordance with the invention.

With reference to FIG. 3, extrusion chamber 8 has a mixing bore 9 within which is mounted rotatable feed screw 10 driven from a power source (not shown). Steam jacket 11 is provided to add additional heat, when desired, to the rubber during extrusion. Downstream of chamber 8 is a pressure chamber 12 into which rubber is delivered by the rotation of screw 10. At the remote end of chamber 12 is die plate 5, preferably cylindrically shaped, having a plurality of radially extending orifices 13 through which rubber is extruded due to the pressure built up in chamber 12 by the rotation of screw 10.

Associated with the extruder is cutter head 14 which comprises cutter housing 15 and cutter means 7 which, preferably, has a cylindrical body mounted for rotation about its longitudinal axis 16 (shown in FIG. 1) which is aligned with the axis of the die plate 5. Cutter means 7 has a plurality of blades 17 projecting radially from and extending longitudinally along body 18 in helical fashion. Each blade has on its free end 19 a cutting edge 20 which is operatively associated with the downstream face of die plate 5. As a result, material extruded through orifices 13 in the die plate is sheared or cut by edges 20 on the cutter means as the cutter rotates.

Die plate 5 comprises an upstream die plate 21 and a mating, downstream die plate 22. Upstream die plate 21 is formed as part of outer tubular cylinder 23 which is rigidly attached to housing 15. Downstream die plate 22 is formed as part of concentric inner tubular cylinder 24 which is dimensioned so as to be sideably movable in cylinder 23, both angularly and axially. By either or both sliding tubular cylinder 24 angularly and axially, the orifice geometry of the die plate can be varied.

While an extruder die/cutter arrangement as shown in FIG. 3 has been used successfully, it is anticipated that the die plate could have other than a cylindrical shape, e.g., flat, and that the cutter could also have other shapes, e.g., a flat chopper as schematically shown in U.S. Pat. No. 3,241,246. The maximum spacing between the die plate and the cutter blades should be about 1 millimeter. The preferred spacing is about 0.2 mm or less, with about 0.1-0.2 mm being the most preferred spacing. Any source of hot pellets may be used in practicing methods in accordance with the present invention.

With reference again to FIG. 1, a stream of carrier gas 25 is generated by a compressor 26 located upstream of zone 6. The carrier gas can be heated or cooled if desired, in heat exchanger 27, provided the carrier gas has a temperature in zone 6 below the melting point temperature of the coating material. To enhance the "zone of interference" effect, as described in more detail below, it is preferred that the carrier gas flow upwardly through zone 6.

The coating material is preferably in the form of fine powder and is entrained in the stream of carrier gas at some point upstream of the zone of interference using a powder feeding system as schematically indicated by reference numeral 28. The powder feeding system can be anyone of well-known construction such as an auger type feeding system such as those commercially available from Acrison Co., U.S.A. and the Dosapro (France) affiliate of Milton Roy Co., U.S.A.

As already noted above, the rubber pellets to be coated are introduced into a first zone 6 of carrier gas stream 25. The rate of carrier gas flow through this zone should be sufficient to both convey the rubber pellets being coated to a downstream separation zone and create a long zone of interference, that is, a long enough zone for the pellets to attain the velocity of the coating stream to ensure complete bombardment of the pellet by the coating powder. However, the flow rate should not be so high as to have a significantly negative effect on the downstream separation equipment, e.g., a cyclone separator, or to reduce the residence time of the pellets to a point where they do not have a chance to melt and begin to cool before reaching the separation equipment. Limitations on the gas flow rate are also imposed by the energy and heat transfer constraints set by melting of the powder and by solidification of the coating. It can be seen that, accordingly, the gas flow rate could vary over a wide range. For example, it is believed that it could be as low as about 75 feet per second. The preferred minimum would be about 100 feet per second. The most preferred minimum would be about 125 feet per second. It is believed that the maximum could be about 300 feet per second, with about 175 feet per second being preferred. The most preferred maximum would be about 150 feet per second.

Once coating powder is entrained in the carrier gas stream to form a coating stream 29, it is then directed to zone 6 into which heated rubber pellets are fed so as to create the zone of interference. This interaction of the coating stream and the rubber pellets is illustrated in detail in FIG. 2. Rubber is extruded through holes 30 in the die plate and then cut into pellets by a cutter blade 31. Reference numeral 32 refers to a rubber pellet just as it is formed and enters the coating stream 33. Upon entering the coating stream, the rubber pellet will have substantially zero or some negative velocity in the direction of flow of the coating stream. On the other hand, the coating stream has a velocity in its direction of flow which is much greater than that of the rubber pellet, e.g., 125-150 feet per second. Accordingly, a relative velocity exists between the rubber pellet and the coating stream, as graphically illustrated by the relative sizes of arrows 34 and 35. Arrow 35 represents the velocity of the rubber pellet and arrow 34 the velocity of the coating stream. A relative velocity will exist for some distance, the zone of interference, along the conduit 36 until the rubber pellet attains substantially the velocity of the coating stream. It is within this zone of interference and due to this relative velocity that particles of coating material will collide with the rubber pellet. It has been discovered that enough collisions take place in a short time to substantially completely coat the rubber pellet with particles of coating material, as indicated at 37. It should be kept in mind that the pellet masses should be large enough that attainment of their ultimate velocity requires a sufficiently long period of time to permit contact of all parts of the pellet surfaces by the coating material. Also, the coating particle masses should be small enough so that their collisions with the pellets will not accelerate the pellets too rapidly. Due to the heat contained in the rubber pellets, the coating particles are at least partially melted 38, preferably completely melted 39, on the surface of the pellet. The particles should each at least be fused at their point of contact with the rubber pellet. Should the heat contained in the rubber not be sufficient to completely melt the coating particles (although it is preferred that enough heat is present), a downstream blast of hot air 40 can be injected into the carrier gas stream to complete the melting of any non-melted particles remaining on the pellet surface. This hot blast of air 40 can be supplied by auxiliary compressor 41 and heat exchanger 42 as shown schematically in FIG. 1. As already noted, it is most preferred that the pellet contain sufficient heat to completely melt the coating particles without the need for an auxiliary blast of hot air. Should the auxiliary blast of hot air be required, the thus-melted coating will be cooled below its melting point by either the conveying air, which is still considerably below the coating particles melting point temperature, or by an auxiliary blast of relatively cold air 43, provided by copressor 44 and heat exchanger 45. The carrier gas and the rubber pellets flow co-currently from first zone 6, the zone of interference, to some downstream second zone 46 for further processing. For example, zone 46 can be a separation zone in which the rubber pellet is separated from the coating stream in a cyclone separator. The rubber pellets are then fed from the separator onto a fluid bed conveyor, of known construction and use, for further cooling and processing, e.g., packaging. If desired, the carrier gas stream from the cyclone can be recycled, particularly if it contains an excess of the coating material. It is preferred that the carrier gas be used on a once through basis, and that the excess of coating material in the carrier gas be kept to a minimum by creation of the zone of interference.

EXAMPLES

Example 1

As stated above, it has been discovered that the total energy and heat transfer characteristics of the pellet, the carrier gas, and the coating material in a gas conveying system can be sufficient to melt-coat the pellet and cool the resulting melt-coating to a temperature below the melting point temperature of the coating material. To confirm this discovery, following are sample thermodynamic and kinetic calculations modelling a desired system:

The total heat required to melt one HDPE (high density polyethylene) particle at 60° C., by conduction is:

$$Q = (\lambda/d) At (\Delta t) \qquad (1)$$

where
$\lambda$ = thermal conductivity, cal-cm/sec.-cm$^2$-°C.
d = conducting distance, say one coating particle diameter, cm
A = average cross-sectional area through which heat is transferred, cm$^2$
t = time interval, sec.
($\Delta t$) = mean thermal driving force for heat transfer, °C.
For HDPE:

$$\lambda = 12 \times 10^{-4} \text{ cal-cm/sec.-cm}^2\text{-°C.}$$

heat of fusion, $\Delta H_f$ = 60 cal/gm.
d = 20 microns = 20 × 10$^{-4}$ cm
particle density, $\rho$ = 0.9 × 0.6 (assume 40% voids),
$\rho$ = 0.54 gm/cm$^3$ When the coating particle collides with the pellet, we assume that the area of contact corresponds to one-fourth the diameter of the particle. This is used to calculate the average area through which heat is transferred, A, by:

$$A = (\tfrac{1}{4} \times 20 \times 10^{-4} \text{ cm})^2 \times (\pi/4)$$

$$A = (5 \times 10^{-4} \text{ cm})^2 \times 0.78$$

$$A = 20 \times 10^{-8} \text{ cm}^2$$

The heat required for fusion of the HDPE particle is:

$$Q_f = \tfrac{\pi}{6} D^3 \times p \times \Delta H_f$$

$$= \left[ \tfrac{3.1}{6} (20 \times 10^{-4})^3 \right] \times .54 \times 60$$

$$= 1.3 \times 10^{-7} \text{ cal}$$

The sensible heat required to raise the temperature of the particle by 75° C., from 60° C. to 135° C., the melting point of HDPE, is calculated by:

$$Q_s = \tfrac{\pi}{6} D^3 \times p \times Cp \times \Delta t$$

where $Cp$ = heat capacity for HDPE = $\tfrac{0.6 \text{ cal}}{\text{gm-°C.}}$ $$Q_s = \left[ \tfrac{3.1}{6} (20 \times 10^{-4})^3 \right] \times .54 \times .6 \times 75$$

$$= 1.0 \times 10^{-7} \text{ cal}$$

Therefore, $$Q = Q_f + Q_s = 2.3 \times 10^{-7} \text{ cal total}$$

The time to heat one particle using a pellet to be coated at 160° C. is calculated from equation (1) by:

$$t = \frac{Qd}{\lambda A (\Delta t)}$$

$$= \frac{(2.3 \times 10^{-7})(20 \times 10^{-4})}{(12 \times 10^{-4})(20 \times 10^{-8})(100)}$$

$$= .02 \text{ second}$$

Accordingly, in a pneumatic conveying system operating at 150 ft/sec gas flow, fusion can occur in:

$$150 (0.02) = 3 \text{ feet}$$

after particle-pellet contact is made in the zone of interference.

Assuming that it is desired to coat 100 grams of rubber at 160° C. with 10 grams of high density polyethylene (HDPE) at 60° C., the total heat required to melt the HDPE is:

$$Q \text{ total} = Q_s + Q_f$$

where $Q_s$ = heat required to heat 10 grams of HDPE from 60° C. to its melting point, 135° C.

$Q_f$ = heat of fusion for HDPE $Q_s$ is calculated by:

$$Q_s = MCp \, \Delta t$$

where $M$ = mass of HDPE = 10 gm $Cp$ = heat capacity for HDPE = $\tfrac{0.6 \text{ cal}}{\text{gm-°C.}}$ $\Delta t$ = 135° C. − 60° C. = 75° C.

$$Q_s = 10 \text{ gm} \times \tfrac{0.6 \text{ cal}}{\text{gm-°C.}} \times 75° \text{ C.}$$

$$= 450 \text{ calories}$$

$Q_f$ is calculated by:

$$Q_f = M \Delta H_f$$

where $M$ = mass of HDPE = 10 gm $\Delta H_f$ = heat of fusion of HDPE = $\tfrac{60 \text{ cal}}{\text{gm}}$ $$Q_f = \tfrac{60 \text{ cal}}{\text{gm}} \times 10 \text{ gm} = 600 \text{ cal}$$

$$\therefore Q \text{ total} = 450 \text{ cal} + 600 \text{ cal} = 1050 \text{ cal}$$

The maximum quantity of heat available from 100 grams of rubber at 160° C. to melt the coating is calculated by:

$$Q_{max} = mCp \Delta t$$

where $m$ = mass of rubber = 100 gm $Cp$ = heat capacity of rubber = $\tfrac{.6 \text{ cal}}{\text{gm-°C.}}$ $\Delta t$ = 160° C. − 135° C. = 25° C.

$$Q_{max} = 100 \text{ gm} \times \tfrac{.6 \text{ cal}}{\text{gm-°C.}} \times 25° \text{ C.}$$

-continued
= 1500 cal

It can, thus, be seen that 100 gm of rubber at 160° C. contains sufficient heat to melt 10 gm of HDPE at 60° C. The remaining 450 calories available from the pellet are more than sufficient to allow for the small heat loss to the conveying air which will occur in this short distance, as shown by the cooling data given below.

Experimental measurements have demonstrated that it is feasible to cool the pellets below the melting point temperature of the coating (137° C. for HDPE) in a pneumatic conveying line.

For example, in a conveying line two inches (2") in diameter and 45 feet long, with an air rate of 413 Kg/hr and an ethylene/propylene rubber pellet rate of 230 Kg/hr, the air was heated from 31° C. to 90° C. The pellets were measured at the line exit at 120° C. A heat balance calculation shows that the pellets entered the system at 170° C.

If it is desired to use higher air inlet temperature, then the conveying line may be made somewhat longer, or cooling air may be injected into the line downstream of the zone of interference.

tested for free flowing character by filling a 2 inch diameter cylinder to a depth of 2 inches, fitting a loose fitting piston on top of the sample and loading the piston to give a 5 psi load on the pellets. After the test time and test temperatures listed in Table I the pellets were rated as excellent (no pellet sticking at all), good (several pellets sticking), fair (many pellets sticking but pellets could be freed by shaking), poor (all of the pellets sticking and difficult to separate), and very poor (pellets massed).

The testing conditions represent typical packaging conditions and therefore represent storage stability of the pellets.

Microscopic examination was used to measure the amount of elastomer surface covered with a continuous film of encapsulating agent. The percentage of elastomer surface coated with a continuous film was calculated from the coated surface area compared to the total area.

These examples show that a film that is at least 80% continuous exhibits good ability to prevent pellets from sticking and to remain free flowing over long periods of time under typical storage conditions.

TABLE I

| | Macroencapsulating of Rubber | | | | |
|---|---|---|---|---|---|
| Run | Encapsulated Rubber | Temp. °F. | Encapsulating Agent | % of Surface (g) Coated with Continuous Film | Test for Free Flowin Pellets |
| | | | | | (e) | (f) |
| 1 | EP (a) | 250 | Polyethylene | 92 | Excellent | Excellent |
| 2 | EP | 300 | " | 96 | " | " |
| 3 | EP | 350 | Polypropylene | 80 | Good | Good |
| 4 | EP | 400 | " | 88 | Excellent | Excellent |
| 5 | EPDM (b) | 300 | Polyethylene | 95 | " | " |
| 6 | Polyisobutylene (c) | 300 | " | 90 | " | " |
| 7 | Butyl Rubber (d) | 300 | " | 97 | " | " |
| 8 | EP (a) | 250 | Hydrocarbon Resin (h) | 100 | " | Good |

Elastomer Properties
(a) ethylene-propylene copolymer containing 43 wt. % ethylene and having a Mooney viscosity (ML @ 212° F.) of 40.
(b) ethylene-propylene-diene terpolymer containing 59 wt. % ethylene, 37.9 wt. % propylene, 3.1 wt. % ethylidene norbornene, and having a Mooney viscosity (ML @ 260° F.) of 60.
(c) $1.4 \times 10^4$ viscosity average molecular weight
(d) 1.5 mole % unsaturation, 55 Mooney viscosity @ 260° F.
Test Conditions
(e) 5 psi for 60 days at 78° F.
(f) 5 psi for 7 days at 135° F.
(g) Microscopic examination of pellet surface
(h) (e.g. petroleum resins as disclosed in U.S. Pat. No. 2,734,046, U.S. Pat. No. 2,753,325 U.S. Pat. No. 2,773,051 and terpene resins as disclosed in U.S. Pat. No. 2,483,124)

Example 2

That any one of a variety of pellets can be heated to a temperature above the melting point temperature of a solid coating material, coated with any of a variety of solid coating materials, melt the solid coating material and then have the melted coating solidified by a coolant is amply demonstrated in British Pat. No. 1,322,623, specifically in Example 2 thereof. Accordingly, Example 2 from that reference is copied below for the purpose of demonstrating the basic principle that elastomeric pellets can be melt-coated, provided a suitable method can be found to accomplish it.

The polymers listed in Table I were extruded in a Braebender extruder equipped with a ½ inch diameter die. The strands were cut into pellets ¼ inch long and dry coated thoroughly with each of the dusting agents being tested. Dusting was carried out at the temperatures indicated in Table I. The hot pellets were contacted with the encapsulating agent, cooled in a liquid bath and air dried at 125° F. The pellets were then Example 3

Figure 2:
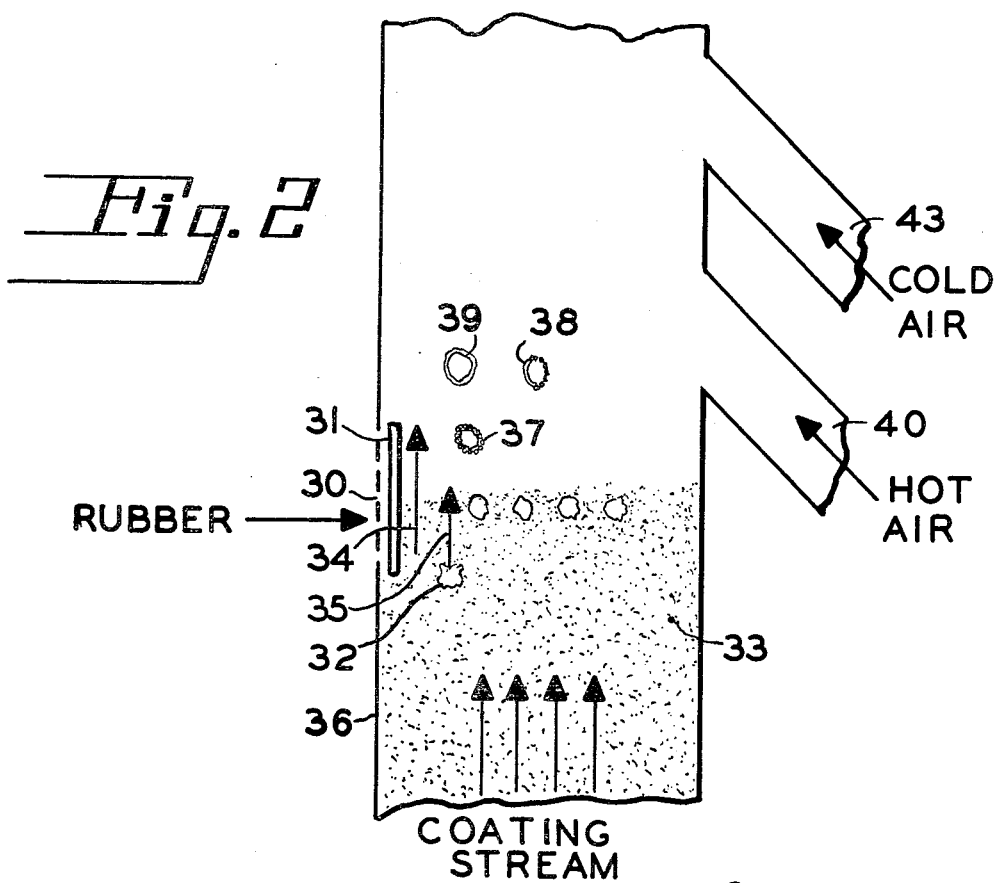
FIG. 2 is a schematic partial view of a gas conveying system illustrating how elastomeric pellets can be melt-coated in accordance with the present invention.

Using equipment generally corresponding to that illustrated in FIG. 1, a series of test runs demonstrated the successful production of coated pellets of elastomeric material. Table II presents results of these tests. The column headed "Dewatering Extruder" represents a dewatering extruder which corresponds to stage 2 in FIG. 1, the column headed "Drying Extruder" represents an extruder corresponding to extruder 3 in FIG. 1, and the column headed "FBC" represents a fluidized bed conveyor corresponding to downstream step 46 as shown in FIG. 1.

The rubber pellets tested were as follows:
Grade 1—ethylene-propylene copolymer containing 42–46 wt. % ethylene, 54–58 wt. % propylene and having ML (1+8) 100° C. of 38–44.
Grade 2—terpolymer containing 47–53 wt. % ethylene, 42.2–48.6 wt. % propylene, 4.4–4.8 wt. % ethylidene norbornene and having ML (1+8) at 100° C. of 37–45.

The coating material was polyethylene powder of 10 to 20 microns in size, and the pneumatic conveying system was an airvey system as generally depicted in FIG. 1.

TABLE II

| Rubber Rate, Kg/hr. | 202 | approx 160 |
|---|---|---|
| Dewatering Extruder | | |
| Product Moisture (wt. % H₂O) | 8.5 | 9.1 |
| Product Temperature (°C.) | 102 | 101 |
| Drying Extruder | | |
| TI4, °C.¹ | 199 | 219 |
| Pneumatic Conveyor | | |
| Temperature downstream of cutter, °C. | 64 | 58 |
| Air Rate, NM³/hr² | 36–38 | 21–22 |
| Temperature upstream of cutter, °C. | 39 | 39 |
| FBC | | |
| Rubber Temperature In, °C. | 106 | — |
| Product Moisture, wt. % H₂O | 1.81, .81 | .54 |

FOOTNOTES:
¹TI4 is the temperature of the rubber taken approximately at location TI4 in FIG. 1. This gives an approximation of the rubber temperature as rubber enters the airvey system.
²NM³/hr - normal cubic meters per hour.

The grade 2 material, a particularly sticky material with poor cold flow properties, was then analyzed using an optical microscope and a scanning electron microscope. A range of coating amounts from 3.4 to 17% polyethylene were examined.

The surfaces of all pellets examined appeared to be quite uniformly coated. However, the particles appeared to be fused to each other and the rubber surface by partial melting, thus forming a discontinuous film. This, of course, would greatly enhance the processibility of the rubber, but would not solve the long term storage problem of cold flow, particularly for the softer rubber grades.

Heat losses to ambient in the test system, due to the failure to take such precautions as providing insulation about the airflow conduits, were responsible for achieving only partial fusion of the coating. This is shown by the values for airvey temperature downstream of the cutter. The airvey temperature upstream of the cutter is also low at 39° C., and should, preferably, be controlled in the range of 60°–90° C. In fact, heating the pellets for a short time on a heating pad gave a continuous polyethylene film. The powder fused into a connected spherulitic morphology with each spherulite being an original polyethylene particle. Examination of a fused pellet under an optical microscope showed the film had good mechanical strength and adhesion to the rubber pellet interior. The film could be drawn so that it would be unlikely that deformation during storage would cause film rupture and subsequent pellet agglomeration.

A scanning electron micrograph was made of a polyethylene shell, produced by extracting the rubber pellet base with hexane after bisecting the pellet. After extraction, a little polyethylene remained which was fairly uniform in thickness. The film that comprised the shell appeared to have good mechanical properties. The micrograph indicated a film thickness of about 25 to 50 microns. From the weight percent (wt. %) polyethylene the calculated coating thickness for the pellet would be about 50 microns, assuming a smooth, cubic pellet 0.3 mm in size.

By practicing methods in accordance with the present invention, one can efficiently and continuously melt-coat rubber pellets. Based on the foregoing description, it should readily occur that many modifications within the skill of the art could be made to the illustrated embodiments without departing from the spirit and scope of the invention. For example, while just one airvey system is shown for coating rubber pellets, a plurality of sych systems could be used, in parallel, with the resulting streams of coated pellets being combined downstream for flow to the separation zone.

In determining the coating particle loading requirements for the carrier gas, it has been found that only small excess amounts of particles may be required, e.g., less than 15% excess particle loading in the carrier stream. It is believed that as the desired coating amount on the pellet decreases, so will the excess requirements.

What is claimed is:

1. A continuous method for making at least one melt-coated pellet of material comprising:
   mixing coating material with at least one stream of carrier gas to form at least one coating stream, the carrier gas having a temperature below the melting point of the coating material;
   contacting at least one pellet of macromolecular material having a glass transition temperature and melting point temperature in the elastomeric range with the coating stream, said pellet having a temperature at or above its melting point and above the melting point of the coating material, so as to form at least one layer of substantially melted coating on the pellet; and
   cooling the resulting melted coating to a temperature below the melting point of the coating material;
   whereby at least one melt-coated pellet is made.

2. A method according to claim 1, wherein the pellet is introduced into the coating stream in such a manner as to create at least one zone of interference in which the coating material coats the pellet.

3. A method according to claim 2, wherein the pellet is caused to flow co-currently with the carrier gas from the zone of interference to a downstream zone.

4. A method according to claim 2 or 3, wherein the coating material is mixed with the carrier gas before the pellet is contacted with the coating stream.

5. A method according to claim 4, wherein the coating material is solid, particulate coating material entrained in the carrier gas.

6. A method according to claim 5, wherein the coating material has a melting point temperature of about 150° F. to 450° F.

7. A method according to claim 6, wherein on a weight basis the melt-coating is about 1% to 15% of the pellet.

8. A method according to claim 7, wherein on a weight basis the melt-coating is about 1% to 10% of the pellet.

9. A method according to claim 8, wherein the melt-coating has an average thickness of about 0.00025 to 0.05 inch.

10. A method according to claim 9, wherein the ratio of the average diameter of the pellet to the average diameter of the coating particles is at least about 10:1.

11. A method according to claim 10, wherein the size of the pellet is about 1/32 to 1 inch.

12. A method according to claim 11, wherein the carrier gas is air.

13. A method according to claim 12, wherein the pellet is EPDM rubber and the coating is polyethylene.

14. A method according to claim 2 or 3 wherein said melted coating is substantially continuous.

15. A method according to claim 1, wherein the velocity of the coating stream is about 75 to 200 feet per second.

16. A method according to claim 15, wherein the velocity of the coating stream is about 100 to 175 feet per second.

17. A method according to claim 15 or 16, wherein the ratio of the average diameter of the pellet to the average diameter of the coating particles is at least about 10:1.

18. A method according to claim 17, wherein the ratio is at least about 25:1.

19. A method according to claim 18, wherein the ratio is at least about 100:1.

20. A method according to claim 19, wherein the pellet is EPDM and the coating material is polyethylene.

21. A method according to claim 15 wherein said melted coating is substantially continuous.

22. A method according to claim 15, wherein the pellet is introduced into the coating stream at substantially zero velocity in the direction of flow of the coating stream.

23. A method according to claim 15, wherein the pellet is introduced into the coating stream at some negative velocity in the direction of flow of the coating stream.

24. A continuous method for making at least one melt-coated pellet of material comprising:
   mixing coating material with at least one stream of carrier gas to form at least one coating stream, wherein the carrier gas has a temperature below the melting point of the coating material and the coating stream has a velocity of about 75 to 200 feet per second;
   introducing at least one tumbling pellet of macromolecular material, said pellet having a glass transition temperature and melting point temperature in the elastomeric range and a temperature above the melting point temperature of both the coating material and the pellet, into the coating stream at substantially zero or some negative velocity in the direction of flow of the coating stream so as to create at least one zone of interference in which at least one layer of substantially melted coating material is formed on the pellet, and
   cooling the resulting melted coating to a temperature below the melting point of the coating material.

* * * * *